United States Patent [19]
Ohta et al.

[11] Patent Number: 4,627,279
[45] Date of Patent: Dec. 9, 1986

[54] DIRECT-HEATED GAS-FLOW MEASURING APPARATUS

[75] Inventors: Minoru Ohta, Okazaki; Kazuhiko Miura, Aichi; Seizi Huzino, Anjo; Kenji Kanehara, Aichi; Tadashi Hattori, Okazaki, all of Japan

[73] Assignee: Nippon Soken, Inc., Nishio, Japan

[21] Appl. No.: 729,855

[22] Filed: May 2, 1985

[30] Foreign Application Priority Data

May 9, 1984 [JP] Japan .................................. 59-91042

[51] Int. Cl.⁴ ................................................ G01F 1/68
[52] U.S. Cl. ........................................ 73/195; 73/204
[58] Field of Search ................................ 73/204, 195

[56] References Cited
U.S. PATENT DOCUMENTS

| | | | |
|---|---|---|---|
| 1,902,427 | 3/1933 | Sawyer | 73/204 |
| 3,979,954 | 9/1976 | Ide et al. | 73/204 |
| 4,304,130 | 12/1981 | Peter et al. | 73/204 |
| 4,317,178 | 2/1982 | Head | 73/861.31 |
| 4,494,406 | 1/1985 | Komons | 73/204 |

Primary Examiner—Herbert Goldstein
Attorney, Agent, or Firm—Cushman, Darby & Cushman

[57] ABSTRACT

A direct-heated gas-flow measuring apparatus for a passage including a plurality of film resistors, disposed within the passage, for generating heat and measuring the temperature thereof, and a feedback control circuit for controlling the heat generated by the film resistors so that the temperature of each of the film resistors is a predetermined value. The feedback control circuit generates a plurality of output signals corresponding to voltages applied to the film resistors. A mean value for the plurality of output signals is calculated as the amount of gas-flow rate.

13 Claims, 8 Drawing Figures

DIRECT-HEATED GAS-FLOW MEASURING APPARATUS

BACKGROUND OF THE INVENTION (1) Field of the Invention

The present invention relates to a direct-heated gas-flow measuring apparatus having film resistors which serve as temperature detecting means as well as electric heaters. Such a direct-heated gas-flow measuring apparatus can be used, for example, for measuring the flow rate of engine intake air.

(2) Description of the Related Art

Generally, in an internal combustion engine, the amount of intake air is one of the most important parameters for controlling the fuel injection amount, ignition timing, and the like. A gas-flow measuring apparatus, i.e., an airflow meter is provided for measuring the same. One of the more common prior art airflow meters is the vane-type, which is, however, disadvantageous in scale, response speed characteristics and the like. Recently, airflow meters having temperature-dependent resistors have been developed, which are advantageous in scale, response speed characteristics and the like.

There are two types of airflow meters having temperature dependent resistors, i.e., the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air. The current flowing through the heater resistor is controlled for constant difference in temperature between the two temperature-dependent resistors, thereby detecting the voltage applied to the heater resistor as the mass flow rate of air.

In this heater-type airflow meter, if no upstream temperature-dependent resistor is provided and the current of the heater resistor is controlled for a constant temperature of the downstream temperature-dependent resistor, the voltage applied to the heater resistor is detected as the volume flow rate of air.

On the other hand, the direct-heated type airflow meter may consist of a film resistor which serves not only as an electric heater, but also as a temperature-detecting means for detecting the temperature of the heated air. Also, the direct-heated type airflow meter may consist of a temperature-dependent resistor for detecting the temperature of non-heated air. Thus, the current flowing through the film resistor and the temperature dependent resistor, thereby detecting the voltage applied to the film resistor as the mass flow rate of air. In this direct-heated type airflow meter too, if no temperature-dependent resistor is provided and the current of the heater resistor is controlled for a constant temperature of the film resistor, the voltage applied to the film resistor is detected as the volume flow rate of air.

A conventional direct-heated airflow meter includes a small measuring tube (duct) in an intake air passage with a single film resistor at the center of the duct. However, since the air flow rate distribution is subject to the air flow rate, the configuration of the intake air passage, the position of the duct, etc., the airflow rate distribution is not always uniform. In other words, the air flow rate within the duct is not always representative of the airflow rate within the intake air passage.

For obtaining the optimum airflow rate for the intake air passage, it has been considered to extend hot wires polygonally over the cross-section of the intake air passage, thus obtaining a mean airflow rate within the intake air passage. In this case, however, the heat mass of the sensing portion, i.e., the hot wires, is so large as to remarkably reduce the response characteristics.

SUMMARY OF THE INVENTION

It is an object of the present invention to provide a direct-heated gas-flow measuring apparatus for a passage, which obtains the optimum gas-flow rate for the passage.

According to the present invention, a plurality of film resistors are provided within the passage. The mean value of output signals obtained from the plurality of film resistors is calculated as the gas-flow rate. As a result, even when the gas-flow rate distribution is not uniform, the optimum gas-flow rate is obtained. Note that, in the present invention, no measuring tube (duct) is provided within the passage.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

Figure 1:
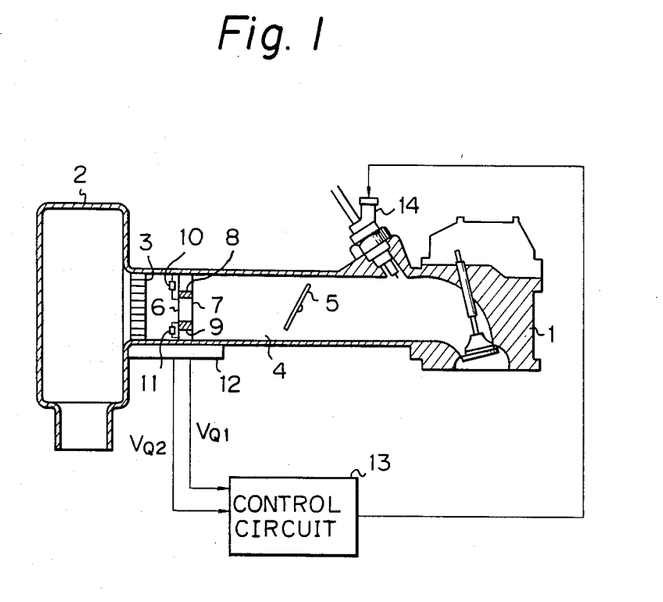
FIG. 1 is a schematic diagram showing the overall configuration of an internal combustion engine including a direct-heated type gas-flow measuring apparatus according to the present invention.

In FIG. 1, which illustrates the overall configuration of an internal engine including a gas-flow measuring apparatus according to the present invention, reference numeral 1 designates a spark ignition engine for driving an automobile in which air for combustion is sucked through an air cleaner 2, a rectifier grid 3 for making the airflow uniform, and an intake air passage 4. Provided in the intake air passage 4 is a throttle valve 5 arbitrarily operated by a driver. The gas-flow measuring apparatus is provided in the intake air passage 4 between the rectifier grid 3 and the throttle valve 5.

The gas-flow measuring apparatus includes a sensing portion inside of the intake air passage 4 and a sensing circuit 12 outside of the intake air passage 4. The sensing portion includes two streamlined insulators 6 and 7, and two film resistors 8 and 9 therebetween. Also, the sensing portion includes temperature-dependent resistors 10 and 11 for detecting the temperature of non-heated air on the upstream side of the insulator 6. The film resistors 8 and 9 and the temperature-dependent resistors 10 and 11 are connected to the sensing circuit 12 encapsulated in a hybrid board.

The sensing circuit 12 controls the current flowing to the film resistor 8 for a constant difference in temperature between the film resistor 8 and the temperature-dependent resistor 10, to generate an output voltage $V_{Q1}$ and transmit it to a control circuit 13, which includes, for example, a microcomputer. Also, the sensing circuit 12 controls the current flowing to the film resistor 9 for a constant difference in temperature between the film resistor 9 and the temperature-dependent resistor 11, to generate an output voltage $V_{Q2}$ and transmit it to the control circuit 13.

The control circuit 13 also receives various kinds of detection signals such as an engine speed signal Ne (not shown) and an engine coolant temperature signal THW (not shown) and controls the valve opening time period of a fuel injection valve (injectors) 14 and the like.

Figure 2:
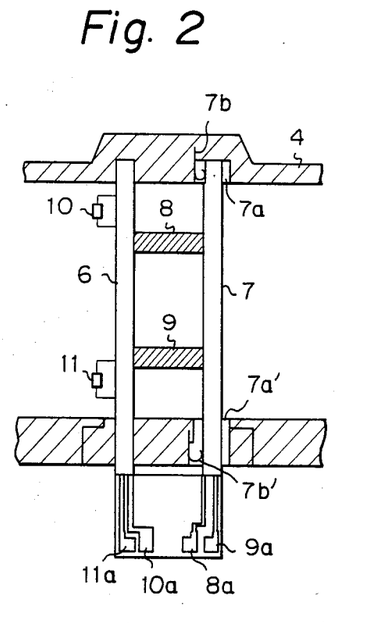
FIG. 2 is a detailed diagram illustrating the gas-flow measuring apparatus of FIG. 1.

The gas-flow measuring apparatus of FIG. 1 will be explained in detail with reference to FIG. 2. Concave portions 7a and 7a' for supporting the insulator 7 are provided inside of the intake air passage 4, and plate springs 7b and 7b are embedded in the concave portions 7a and 7a', respectively. Thus, the film resistors 8 and 9 are always in a tension state. The film resistors 8 and 9 and the temperature-dependent resistors 10 and 11 are connected via lead lines (not shown) to electrodes 8a, 9a, 10a, 10b, respectively, which are connected to the sensing circuit 12.

Figure 3:
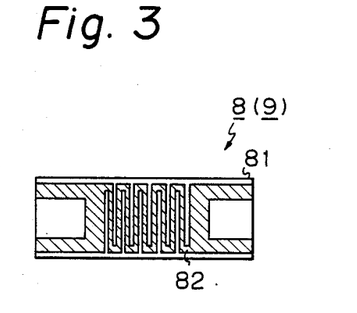
FIG. 3 is a plan view of the film resistor of FIG. 1.

The film resistors 8 and 9 have the same configuration. That is, as illustrated in FIG. 3, the film resistor 8 consists of an insulating substrate 81 such as a ceramic substrate or monocrystalline silicon substrate, a resistance pattern 82 of platinum (Pt), gold (Au), etc., on the insulating substrate, and a heat-resistant resin (not shown) on the resistance pattern 82.

Figure 4:
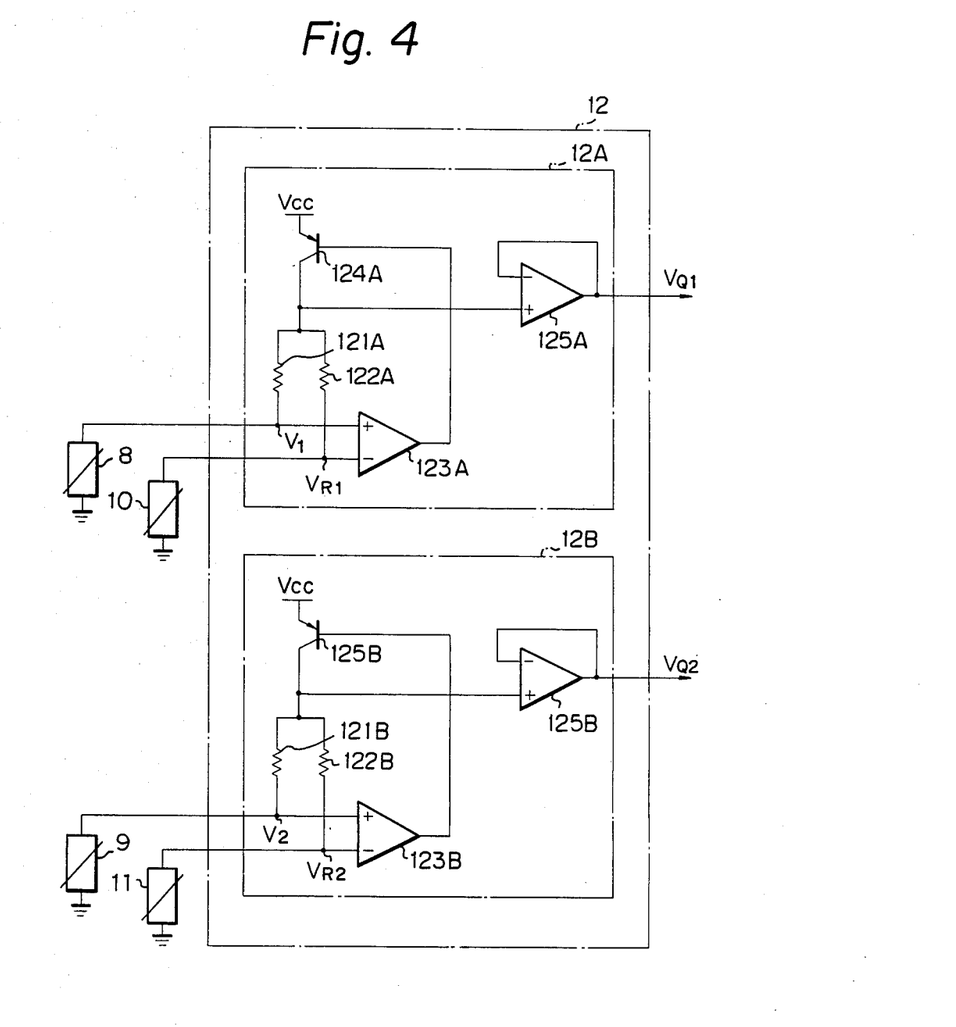
FIG. 4 is a circuit diagram of the sensing circuit of FIG. 1.

As illustrated on FIG. 4, the sensing circuit 12 includes two identical circuits 12A and 12B. The circuit 12A includes resistors 121A and 122A, which form a bridge circuit with the film resistor 8 and the temperature-dependent resistor 10; a comparator 123A; a transistor 124A controlled by the comparator 123A; and a voltage buffer 125A. Similarly, the circuit 12B includes resistors 121B and 122B, which form a bridge circuit with the film resistor 9 and the temperature-dependent resistor 11; a comparator 123B; a transistor 124B controlled by the comparator 123B; and a voltage buffer 125B.

The sensing circuit 12A operates as follows. When the amount of air flowing through the intake air passage 4 increases, thus reducing the temperature of the film resistor 8, which, in this case, serves as a thermistor, the resistance value thereof decreases so as to satisfy the following condition:

$$V_1 < V_{R1}$$

where $V_1$ is the potential at the node between the resistor 121A and the film resistor 8 and $V_{R1}$ is the potential at the mode between the resistor 122A and the temperature-dependent resistor 10. As a result, the output potential of the comparator 123A is reduced, thereby increasing the conductivity of the transistor 124A. Therefore, the heat generated by the film resistor 8 is increased and, simultaneously, the collector potential of the transistor 124A is increased, so that the output voltage $V_{Q1}$ of the voltage buffer 125A is also increased.

Contrary to this, when the amount of air flowing through the intake air passage 4 decreases, thus increasing the temperature of the film resistor 8, the resistance value thereof increases so as to satisfy the following condition:

$$V_1 < V_{R1}$$

As a result, the output potential of the comparator 123A is increased, thereby decreasing the conductivity of the transistor 124A. Therefore, the heat generated by the film resistor 8 is decreased and, simultaneously, the collector potential of the transistor 124A is decreased, so that the output voltage $V_{Q1}$ of the voltage buffer 125A is also decreased.

Thus, feedback control is performed by the circuit 12A upon the temperature of the film resistor 8 for a constant difference in temperature between the film resistor 8 and the temperature-dependent resistor 10, which, in this case, detects the temperature of ambient air. Thus, the output voltage $V_{Q1}$ of the output buffer 125A indicates the amount of air flowing through the intake air passage 4 at the position where the film resistor 8 is located.

Similarly, feedback control is performed by the circuit 12B upon the temperature of the film resistor 9 for a constant difference in temperature between the film resistor 9 and the temperature-dependent resistor 11, which, in this case, detects the temperature of ambient air. Thus, the output voltage $V_{Q2}$ of the output buffer 125B indicates the amount of air flowing through the intake air passage 4 at the position where the film resistor 9 is located.

Figure 5:
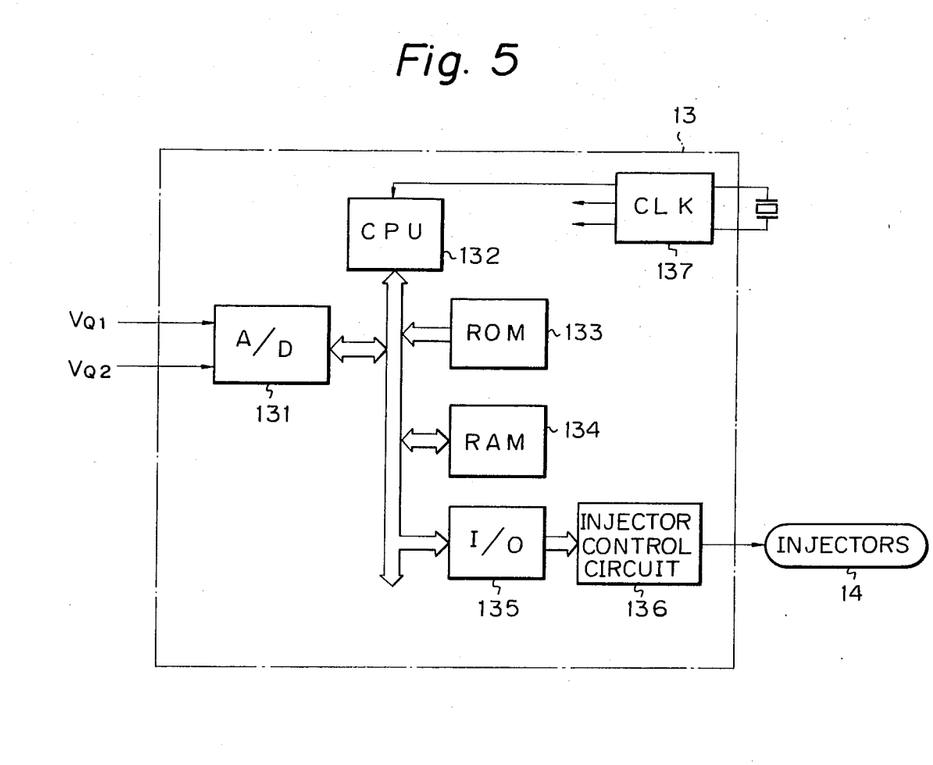
FIG. 5 is a circuit diagram of the control circuit of FIG. 1.

In FIG. 5, which is a detailed circuit diagram of the control circuit of FIG. 1, the control circuit 13 includes a multiplexer incorporating an analog/digital (A/D) converter 131; a central processing unit (CPU) 132; a read-only memory (ROM) 133 for storing programs and constants; a random-access memory (RAM) 134 for storing temporary data; an input/output (I/O) interface 135; an injector control circuit 136 for controlling the injectors 14; and a clock signal generating circuit 137 for generating various kinds of check signals and transmitting them to each portion within the control circuit 13.

The operation of the control circuit 13 of FIG. 1 will be explained with reference to FIG. 6A, which is an A/D conversion routine executed at every predetermined time period. At step 601, A/D conversion is performed upon the output signal $V_{Q1}$ of the sensing circuit 12, and the converted value is fetched. Then, at step 602, the intake air amount Q1 is calculated by using the converted value $V_{Q1}$ based upon a map f stored in the ROM 133. Similarly, at step 609, A/D conversion is performed upon the output signal $V_{Q2}$ of the sensing circuit 13, and the converted value is fetched. Then, at step 604, the intake air amount Q2 is calculated by using the converted value $V_{Q2}$ based upon the map f stored in the ROM 133. At step 605, Q←(Q1+Q2)/2. That is, a mean value Q of Q1 and Q2 is calculated. Then, at step 606, the mean value Q of the intake air amount is stored in the RAM 134.

Figure 6A:
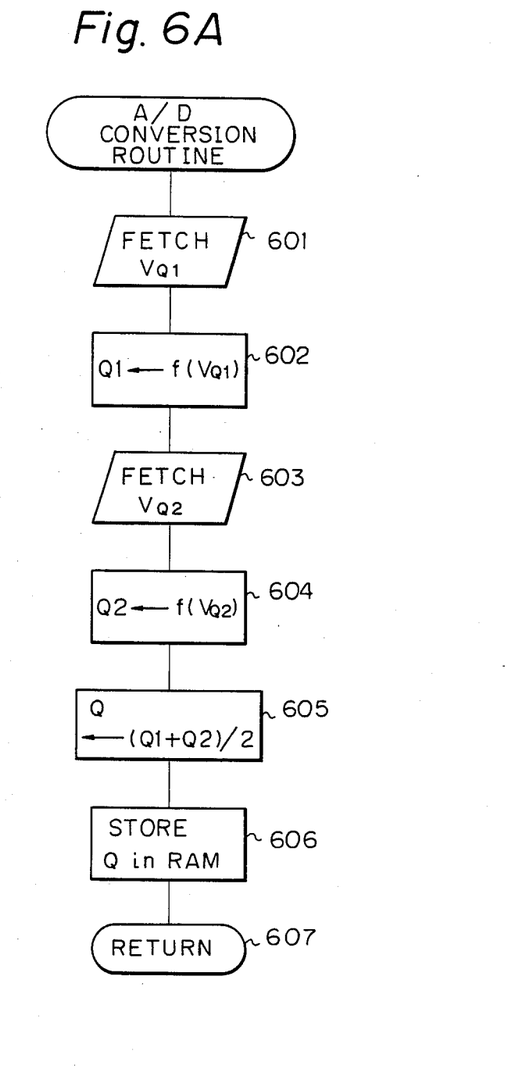
FIGS. 6A and 6B are flow charts illustrating the operation of the control circuit of FIG. 1.

The routine of FIG. 6A is ended by step 607.

The intake air amount data Q stored in the RAM 134 may be used in a fuel injection amount calculating routine, an ignition timing calculating routine, and the like.

In the above-mentioned embodiment, a mean value is calculated for two kinds of intake air amounts, however, a mean value can be calculated for three or more kinds of intake air amounts by providing three or more film resistors in the intake air passage 4. That is, in this case, step 605 calculates:

$$Q \leftarrow (Q1+Q2+ \ldots +QN)/N$$

where N is the number of film resistors in the intake air passage. Further, at step 605, instead of $Q \leftarrow (Q1+Q2)/2$, the following can be calculated:

$$Q \leftarrow K_1Q1+K_2Q2$$

where $K_1+K_2=1$. The constants $K_1$ and $K_2$ are determined in accordance with various conditions, such as the configuration of the intake air passage. Further, in FIG. 4, the film resistors 8 and 9 are controlled by the separate circuits 12A and 12B. However, it is possible to control the film resistors by a single circuit such as 12A. In this case, the film resistor 9 is connected in parallel to the film resistor 8.

Figure 6B:
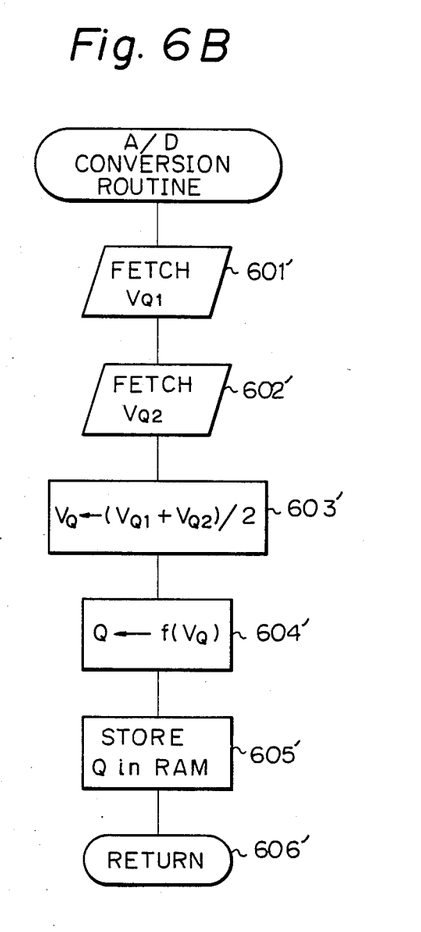

In FIG. 6B, which is a modification of FIG. 6A, at step 601', A/D conversion is performed upon the output signal $V_{Q1}$ of the sensing circuit 13, and the converted value is fetched. Then, at step 602', A/D conversion is performed upon the output signal $V_{Q2}$ of the sensing circuit 13, and the converted value is fetched. At step 603', a mean value $V_Q$ is calculated by $$V_Q \leftarrow (V_{Q1}+V_{Q2})/2.$$

Next, at step 604', the intake air amount Q is calculated by using the mean value $V_Q$ based upon the map f stored in the ROM 133. Then, the value Q of the intake air amount is stored in the RAM 134.

The routine of FIG. 6B is ended by step 606'.

The above-mentioned modifications to the routine of FIG. 6A can be applied to the routine of FIG. 6B.

Figure 7:
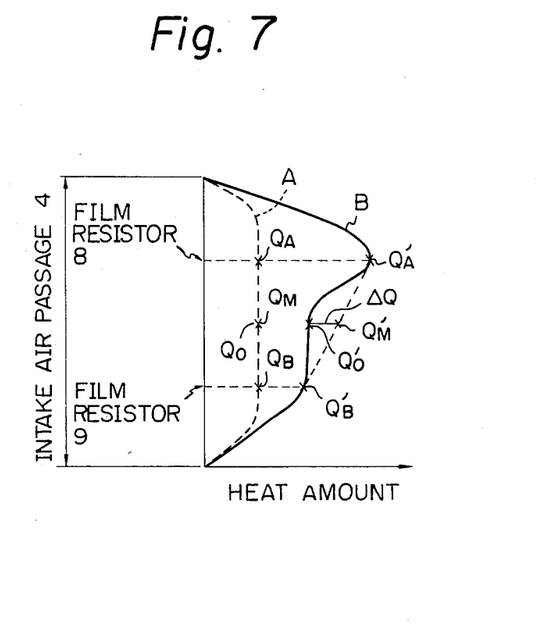
FIG. 7 is a graph illustrating the effect of the present invention.

In FIG. 7, which shows the effect of the present invention, if the air flow rate distribution is uniform, as indicated by an arrow A, and $Q_A$ and $Q_B$ correspond to the intake air amounts obtained by the film resistors 8 and 9. In this case, the mean value $Q_M$ of $Q_A$ and $Q_B$ indicates an optinum value for the entire intake air passage. Also in this case, the center value $Q_0$ obtained by the film resistor at the center of the intake air passage as the prior art indicates an optinum value for the entire intake air passage.

Contrary to this, if the airflow rate distribution is not uniform, as indicated by an arrow B, the mean value $Q_M'$ of $Q_A'$ and $Q_B'$ obtained by the film resistors 8 and 9 is shifted by $\Delta Q$ from the center value $Q_0'$. Clearly, the mean value $Q_M'$ indicates a more optimum value for the entire intake air passage as compared with the center value $Q_0'$.

As explained hereinbefore, according to the present invention, an optimum gas-flow rate can be obtained.

We claim:

1. A direct-heated gas-flow measuring apparatus for measuring the gas-flow rate within a passage, comprising:

two parallel supporting members disposed within said passage;

a plurality of film resistors for generating heat and detecting the temperature thereof, said film resistors extending between said supporting members to expose both surfaces of each of said film resistors to the gas-flow;

feedback control means, connected to said film resistors, for controlling the heat generated by each of said film resistors so that the temperature of each of said film resistors is a predetermined value, said feedback control means generating a plurality of output signals corresponding to voltages applied to said film resistors; and calculating means, connected to said feedback control means, for calculating a mean value of said plurality of output signal generated by said feedback control means, the mean value indicating the amount of gas-flow rate.

2. An apparatus as set forth in claim 1, further comprising a plurality of temperature-dependent resistors, each provided near one of said film resistors, for detecting the temperature of the gas stream, said feedback control means controlling the heat generated by said film resistors so that the difference in temperature between each of said film resistors and its corresponding temperature-dependent resistor is constant.

3. An apparatus as set forth in claim 2, wherein each of said temperature-dependent resistors is fixed to one of said supporting members.

4. An apparatus as set forth in claim 2, wherein each of said film resistors and each of said temperature-dependent resistors is electrically connected via at least one of said supporting members to said feedback control means.

5. An apparatus as set forth in claim 2, wherein at least one of said supporting members has a portion protruded from said passage and an electrode connected to one of said film resistors and to one of said temperature-dependent resistors is formed on the protruded portion.

6. An apparatus as set forth in claim 1, where said calculating means calculates said mean value of said plurality of output signals by weighting them.

7. An apparatus as set forth in claim 1, wherein said two supporting member are arranged so as to be parallel with respect to the direction of gas-flow.

8. An apparatus as set forth in claim 1, wherein said supporting members are made of insulator material.

9. An apparatus as set forth in claim 1, wherein each of said supporting members has a streamlined shape.

10. An apparatus as set forth in claim 1, further comprising: pushing for separating said supporting members from each other, so that said film resistors are in a tension state.

11. An apparatus as set forth in claim 1, wherein each of said film resistors is rectangular in shape and the short sides thereof are supported by said supporting members.

12. An apparatus as set forth in claim 1, wherein each of said film resistors is electrically connected via at least one of said supporting members to said feedback control means.

13. An apparatus as set forth in claim 1, wherein at least one of said supporting member has a portion protruded from said passage, and an electrode connected to one of said film resistors, is formed on the protruded portion.

* * * * *